US012634427B2

(12) United States Patent
Evers et al.

(10) Patent No.: US 12,634,427 B2
(45) Date of Patent: May 19, 2026

(54) SYSTEM AND METHOD FOR IMAGING A BODY OF A PERSON

(71) Applicant: Rohde & Schwarz GmbH & Co. KG, Munich (DE)

(72) Inventors: Christian Evers, Heimstetten (DE); Frank Gumbmann, Nuremberg (DE); Marius Brinkmann, Munich (DE); Gerhard Hamberger, Griesstaett (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 138 days.

(21) Appl. No.: 18/216,206

(22) Filed: Jun. 29, 2023

(65) Prior Publication Data

US 2024/0080430 A1 Mar. 7, 2024

(30) Foreign Application Priority Data

Sep. 6, 2022 (EP) ..................................... 22194022

(51) Int. Cl.
*H04N 13/254* (2018.01)
*G06T 7/00* (2017.01)
*G06T 7/60* (2017.01)

(52) U.S. Cl.
CPC ......... *H04N 13/254* (2018.05); *G06T 7/0012* (2013.01); *G06T 7/60* (2013.01);
(Continued)

(58) Field of Classification Search
CPC ....... H04N 13/254; G06T 7/0012; G06T 7/60; G06T 2207/10012; G06T 2207/20084;
(Continued)

(56) References Cited

U.S. PATENT DOCUMENTS 8,922,420 B2 * 12/2014 Huizing ............... G06V 40/103
342/21
10,008,039 B1 * 6/2018 Neustein ............ G06Q 30/0643
(Continued)

FOREIGN PATENT DOCUMENTS

DE 10 2010 013 580 A1 10/2011
JP 6276736 B2 2/2018
WO WO-2012119216 A1 * 9/2012 ............. G01T 1/167

OTHER PUBLICATIONS

Office Action for related European Patent Application No. 22194022. 4-1113, dated Feb. 10, 2023, 9 pages.

*Primary Examiner* — Tat C Chio
(74) *Attorney, Agent, or Firm* — DITTHAVONG, STEINER, & MLOTKOWSKI

(57) ABSTRACT

The invention relates to a system (10) for imaging a body (11) of a person. The system (1) comprises a sensor unit (12) configured to capture first imaging data of the body, wherein the sensor unit (12) comprises an optical camera and/or an infrared camera and/or an acoustic imaging sensor; an electromagnetic, EM, wave scanner (14) configured to capture second imaging data of the body, wherein the EM wave scanner comprises a plurality of antennas (15) which are configured to transmit EM radiation in a mm and/or cm range towards the body (11), and to receive a reflection of said EM radiation from the body (11); and a processing unit (16) which is configured to process the first imaging data and the second imaging data and to generate a three-dimensional image (33) of the body (11) based on said processing.

15 Claims, 5 Drawing Sheets

(52) U.S. Cl.
CPC ............... *G06T 2207/10012* (2013.01); *G06T 2207/20084* (2013.01); *G06T 2207/30004* (2013.01); *G06T 2207/30196* (2013.01)

(58) Field of Classification Search
CPC . G06T 2207/30004; G06T 2207/30196; G01S 13/862; G01S 13/867; G01S 15/89; G01S 13/89; G06V 40/103; G06V 10/803; A61B 5/1079; A61B 5/6889; A61B 2503/12; A61B 5/0064; A61B 5/0507; A61B 5/107; A61B 5/0035; A41H 1/02
See application file for complete search history.

(56) References Cited

U.S. PATENT DOCUMENTS

| | | | |
|---|---|---|---|
| 11,000,188 B2 * | 5/2021 | Farahbakhshian ....... | A61B 5/70 |
| 2011/0317008 A1 | 12/2011 | Sam | |
| 2015/0164327 A1 * | 6/2015 | Yaroslavsky ........ | A61B 5/0035 |
| | | | 600/407 |
| 2021/0364629 A1 * | 11/2021 | Ryder .................. | G06V 10/255 |
| 2023/0355120 A1 * | 11/2023 | Honma .............. | A61B 5/02416 |

* cited by examiner

SYSTEM AND METHOD FOR IMAGING A BODY OF A PERSON

RELATED APPLICATION

This application claims priority from European Patent Application No. 22 194 022.4, titled "System and Method for Imaging a Body of a Person," filed Sep. 6, 2022, the contents of which are hereby incorporated herein in its entirety by this reference.

TECHNICAL FIELD OF THE INVENTION

The invention relates to a system and a method for imaging a body of a person, for instance, to determine a clothing size of the person.

BACKGROUND OF THE INVENTION

Body scanners can be used to determine the clothing size of a person. For instance, less expensive body scanners can detect the shape of a body by means of optical sensors, such as cameras or laser scanners.

However, such body scanners have the disadvantage that a user has to undress to a large extent to perform a scan. This is time-consuming and can be unpleasant for many users. If used in an area that is open to the public, such as a shopping center, a separate room needs to be provided for the body scanner, which limits the application possibilities of the scanner.

SUMMARY OF THE INVENTION

Thus, it is an objective to provide an improved system and an improved method for imaging a person. In particular, the above-mentioned disadvantages should be avoided.

The objective is achieved by the solution provided in the enclosed independent claims. Advantageous implementations of the present invention are further defined in the dependent claims.

According to a first aspect, the invention relates to a system for imaging a body of a person. The system comprise a sensor unit configured to capture first imaging data of the body, wherein the sensor unit comprises an optical camera and/or an infrared camera and/or an acoustic imaging sensor; an electromagnetic, EM, wave scanner configured to capture second imaging data of the body, wherein the EM wave scanner comprises a plurality of antennas which are configured to transmit EM radiation in a mm and/or cm range towards the body, and to receive a reflection of said EM radiation from the body; and a processing unit which is configured to process the first imaging data and the second imaging data, and to generate a three-dimensional image of the body based on said processing.

This achieves the advantage that a 3D image of a person's body can be acquired based on two different types of measurements. For instance, the sensor unit captures one or more optical images of the person which show the clothes of the person, while the image captured by the EM wave scanner can comprise additional information about the body of the person under the clothing. In this way, the size of the body can be determined with high accuracy.

The system can form a body scanner for scanning the body of the person. In particular, the person can wear clothes during the scan and does not have to undress. The three-dimensional image can show at least a portion of the person's body, e.g. the legs and the torso, or the entire body.

Capturing imaging data may refer to capturing data from which one or more images, in particular 3D images, or a video can be generated. The imaging data can be digital or analog data. The imaging data can be forwarded to the processor via respective data interfaces (in case of analog imaging data after a digitalization step). The first and/or second imaging data can comprise or can be converted into 3D imaging data, e.g. a 3D point cloud, a 3D mesh, individual 3D points (3D pixels) or other 3D coordinates in space. Such conversion could be carried out by the sensor unit respectively the EM wave scanner and/or by the processing unit.

The first imaging data can be optical and/or infrared and/or acoustic imaging data, i.e. imaging data generated based on optical and/or infrared and/or acoustic measurements by the sensor unit. Here, optical imaging data refers to imaging data that was captured in a visible range of the EM spectrum. An optical camera is a camera for capturing such optical imaging data. In particular, the first imaging data shows the clothes that the person is wearing. The second imaging data can be millimeter (mm) and/or centimeter (cm) wave imaging data, i.e. imaging data generated based on captured EM wave reflections in the mm and/or cm range of the EM spectrum.

Processing the first imaging data and the second imaging data may refer to extracting and/or generating spatial information from the first and/or the second imaging data. The processor can generate the three-dimensional image based on said spatial information and, in particular, based on deviations between the spatial information between the first imaging data and the second imaging data. For instance, the processing unit can be configured to generate the three-dimensional image of the body by rendering the image based on said spatial information using a suitable rendering technique. The processing unit can subsequently display the rendered image on a display of the system.

In an embodiment, the processing unit is configured to determine a clothing surface of the body based on the first imaging data.

The clothing surface may correspond to the part(s) of the body in the three-dimensional image that is/are covered by clothes. The clothing surface can be determined based on the first imaging data which comprises optical and/or infrared and/or ultrasound imaging data.

In an embodiment, the processing unit is configured to smooth the clothing surface of the body in the three-dimensional image, for instance by removing wrinkles or folds from the clothing surface in the three-dimensional image.

In an embodiment, the processing unit is configured to generate the three-dimensional image of the body based on the first imaging data, and to modify said three-dimensional image, in particular to increase a level of detail or remove unwanted image components, based on information extracted from the second imaging data. This achieves the advantage that an accurate 3D image of a person's body can be acquired based on two measurements.

In an embodiment, the sensor unit is configured to capture the first imaging data with a first resolution, and the EM wave scanner is configured to capture the second imaging data with a second resolution which is lower than the first resolution. This achieves the advantage that a less expensive EM wave scanner can be used, thus, reducing the overall system costs.

In an embodiment, the second imaging data comprises reflections of the EM radiation from the clothing of the person as well as from a skin of the person beneath the clothing.

In other words, the EM wave scanner can be configured to receive reflections of the EM radiation from the clothing of the person as well as from the skin of the person under said clothing. The EM wave scanner can be configured to generate the second imaging data from both of these reflections (from the clothing and the skin below). This achieves the advantage that the second imaging data can comprise information about both the clothing surface of the person as well as the surface of the person beneath the clothing.

In an embodiment, the processing unit is configured to generate the three-dimensional image of the body based on the first imaging data and based on the reflections of the EM radiation from the clothing of the person in the second imaging data, in particular if the clothing or certain items of the clothing are not captured completely by the first imaging data. This achieves the advantage that a more complete 3D image of the clothed person can be generated. The second imaging data (or parts thereof) can be used to complement the first imaging data when generating the 3D image.

In an embodiment, the processing unit is configured to determine spatial coordinates of the body under the clothing based on the reflections of the EM radiation from the skin of the person in the second imaging data. This achieves the advantage that the system can receive information about the actual body of the person under the clothes without the person having to undress.

In an embodiment, the processing unit is configured to determine deviations, in particular spatial deviations, between a surface of the clothed body in the three-dimensional image and the spatial coordinates of the body under the clothing. This achieves the advantage that information about the fit of the clothing on the person can be obtained. For instance, the larger these deviations, the looser the clothes fit on the body.

In an embodiment, the EM wave scanner is configured to selectively capture further second imaging data of parts of the body for which the deviations exceeded a threshold value, wherein these further second imaging data are captured with an increased resolution as compared to the second imaging data.

In an embodiment, the processing unit is configured to modify or reconstruct the parts of the body in the three-dimensional image for which the deviations exceed the threshold value.

For instance, when modifying the parts of the three-dimensional image, the processing unit can be configured to remove folds, wrinkles or protruding clothing from the image of the body. In this way, it can be ensured that the body shown in the 3D image resembles the actual body shape of the person and is not overly distorted by protruding clothing.

In an embodiment, the processing unit comprises an artificial intelligence, AI, unit, in particular a trainable neural network.

In an embodiment, the processing unit is configured to analyze the three-dimensional image of the body in order to detect a medical anomaly.

For instance, the processing unit can be configured to analyze a size of specific body parts or parts of said body parts in the three-dimensional image to detect the medical anomaly. This analysis can also be carried out by the AI unit, which can be trained for detecting such anomalies.

In an embodiment, the processing unit is configured to determine the dimensions of at least one body part and/or to determine at least one clothing size of the person based on the three-dimensional image of the body.

In particular, the processing unit is configured to determine said dimensions or clothing size after the three-dimensional image was modified by the processing unit.

In an embodiment, the plurality of antennas of the EM wave scanner are arranged in at least two vertically displaced antenna arrays.

In an embodiment, at least a part of the sensor unit is arranged in-between two of the vertically displaced antenna arrays.

Alternatively, the antennas of the EM wave scanner can be arranged in one large antenna array.

In an embodiment, the sensor unit and the EM wave scanner are rotatably arranged around a defined imaging area of the system.

For instance, to capture the imaging data, the person stands in the imaging area. By rotating the sensor unit and the EM wave scanner, imaging data from all sides of the person can be recorded.

In an embodiment, the system further comprises a rotatable platform for the person to stand on, and the sensor unit and the EM wave scanner are stationary arranged relative to the platform.

A rotation speed of the platform and/or of the rotatably arranged sensor unit and the EM wave scanner can be constant. However, the rotation speed can also be enhanced or reduced for instance, e.g., if a resolution of the EM wave scanner is enhanced.

According to a second aspect, the invention relates to a method for imaging a body of a person. The method comprises the steps of: capturing first imaging data of the body by means of optical imaging and/or infrared imaging and/or acoustic imaging; capturing second imaging data by transmitting EM radiation in a mm and/or cm range towards the body, and by receiving a reflection of said EM radiation from the body; processing the first imaging data and the second imaging data; and generating a three-dimensional image of the body based on said processing.

The above description with regard to the system according to the first aspect of the invention is correspondingly valid for the method according to the second aspect of the invention.

BRIEF DESCRIPTION OF THE DRAWINGS

The invention will be explained in the following together with the figures.

DETAILED DESCRIPTION OF THE PREFERRED EMBODIMENTS

Figure 1:
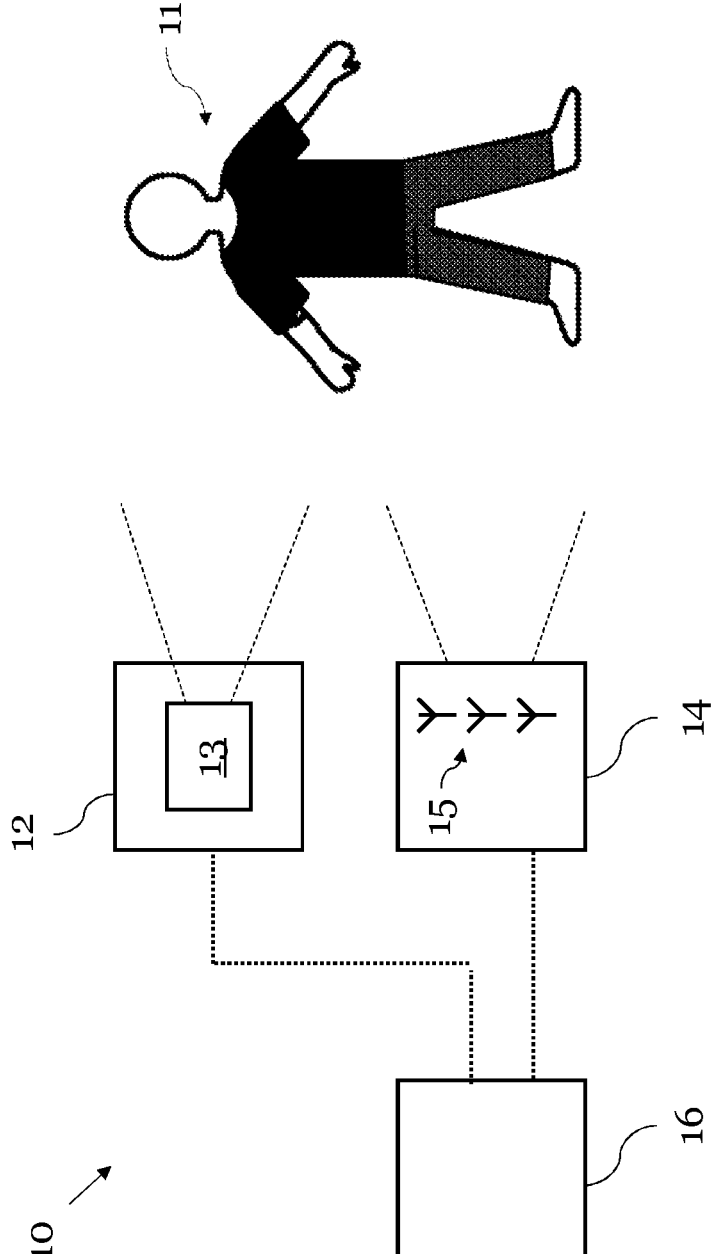
FIG. 1 shows a schematic diagram of a system for imaging a body of a person according to an embodiment.

FIG. 1 shows a system 10 for imaging a body 11 of a person according to an embodiment.

The system 10 comprises a sensor unit 12 configured to capture first imaging data of the body 11, wherein the sensor unit 12 comprises an optical camera and/or an infrared camera and/or an acoustic imaging sensor. The system 10 further comprises an EM wave scanner 14 configured to capture second imaging data of the body, wherein the EM wave scanner 14 comprises a plurality of antennas 15 which are configured to transmit EM radiation in a mm and/or cm range towards the body 11, and to receive a reflection of said EM radiation from the body 11. The system 10 further comprises a processing unit 16 which is configured to process the first imaging data and the second imaging data and to generate a three-dimensional image of the body 11 based on said processing.

The system 10 can form a body scanner for scanning a body of a person, in particular a person wearing clothes.

Here, capturing imaging data of the body 11 may refer to capturing imaging data of at least a part of the body 11 (e.g., legs and torso). The head or other parts of the body could thereby be left out depending on the application.

The optical camera, the infrared camera and/or the acoustic imaging sensor can form one or more camera units 13 of the sensor unit 12. For instance, the acoustic imaging sensor can be an ultrasonic camera or an ultrasonic sensor. The sensor unit 12 can further comprise a laser scanner.

The EM wave scanner 14 can be a mm wave scanner and/or a cm wave scanner. The EM radiation can be transmitted and/or received by the EM wave scanner 14 in the form of radio frequency (RF) signals in the respective wavelength range. The EM radiation can be cm wave or mm wave radiation and can at least partially penetrate the person's clothing during the capture of the second imaging data.

The antennas 15 can comprise transmit and/or receive antennas for transmitting respectively receiving the EM radiation.

The processing unit 16 can be connected to the sensor unit 12 and the EM wave scanner 14 via a communication line. For example, the processing unit 16 can be an external computer that is connected to the sensor unit 12 and the EM wave scanner 14. The processing unit 16 comprises a microprocessor.

The (first/second) imaging data can form one or more (first/second) images or a (first/second) video of the body 11 of the person. The imaging data preferably comprise or can be converted into 3D imaging data, e.g. a 3D point cloud. The processing unit 16 can be configured to generate the three-dimensional image from this 3D imaging data.

In an example, the optical camera, the infrared camera and/or the acoustic imaging sensor capture a number of 2D images of the body 11 which are subsequently converted to 3D imaging data by the sensor unit 12 and/or by the processing unit 16, e.g. by means of photogrammetric techniques.

The processing unit 16 can be configured to determine a clothing surface of the body 11, i.e. the part(s) of the body 11 that is covered by clothing, based on the first imaging data. The processing unit 16 can further be configured to smooth the clothing surface of the body 11 in the three-dimensional image, for instance by removing wrinkles or folds from the clothing surface in the three-dimensional image.

Furthermore, the processing unit 16 can be configured to use information extracted from the second imaging data to increase a level of detail or remove unwanted components in the three-dimensional image. Examples of how this can be done are shown below in FIGS. 3 and 4.

Figure 2:
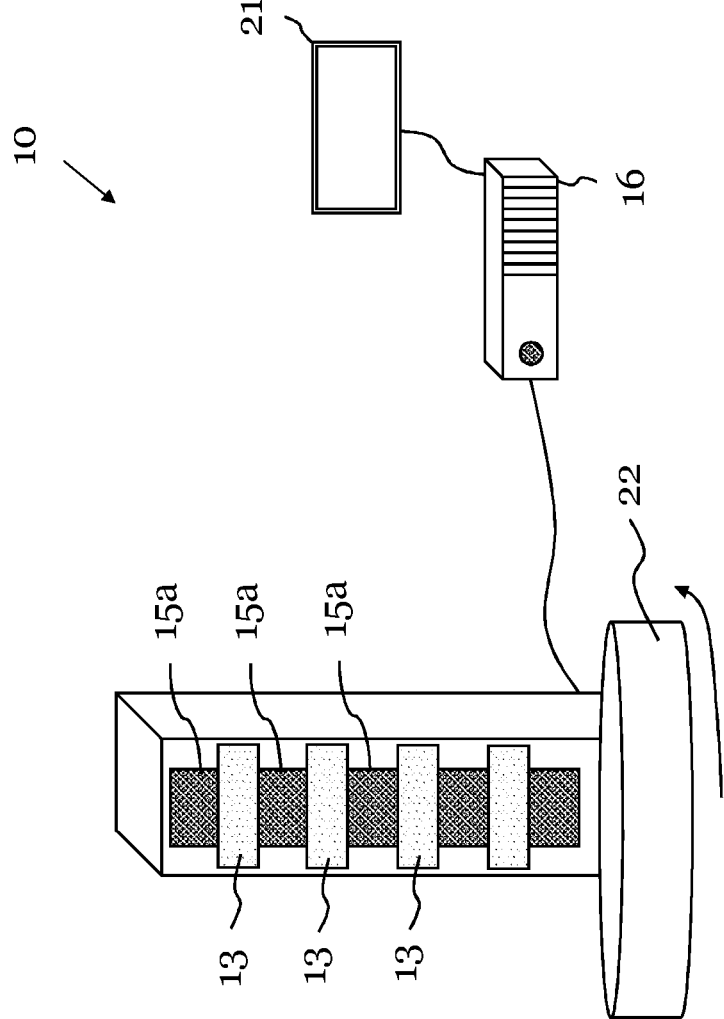
FIG. 2 shows a schematic diagram of a system for imaging a body of a person according to an embodiment.

FIG. 2 shows a schematic diagram of the system 10 according to an embodiment.

As shown in FIG. 2, the plurality of transmit and/or receive antennas 15 of the EM wave scanner 14 are arranged in a plurality of vertically displaced antenna arrays 15a (or clusters). Each antenna array 15a can be arranged in a different height. For instance, each antenna array 15a or cluster comprises 96 antennas. The number of vertically arranged antenna arrays 15a can be kept small to reduce the costs of the system 10.

At least a part of the sensor unit 12 can be arranged in-between two of the vertically displaced antenna arrays 15.

However, in general, the antennas 15 of the EM wave scanner 14 could also be arranged in one large antenna array, in particular a vertically-extended antenna array. This large antenna array is, e.g., formed by combining multiple antenna clusters to one large antenna array.

For instance, the sensor unit 12 comprises one or more camera units 13 that can capture images (single shots) and/or videos. Each camera units 13 can comprise at least one of: an optical camera unit, an infrared camera unit and/or an acoustic camera unit. These camera units 13 can be arranged in-between the antenna arrays 15a. For instance, the antenna arrays 15a and the camera units 13 can be arranged consecutively one after another, e.g. each antenna array 15a and camera unit 13 forming a respective module of the sensor unit 12 and EM wave scanner 14. The antenna arrays 15a and the camera units 13 could also be arranged in two different vertical columns.

The elements of the sensor unit 12 and the EM wave scanner 14 can be integrated in a column as shown in FIG. 2, wherein the person stands next to the column during a scan.

The system 10 can further comprise a rotatable platform 22 or base for the person to stand on. The sensor unit 12 and the EM wave scanner 14 are stationary arranged relative to the platform 22. In this way, imaging data from all sides of the person can be recorded.

Alternatively, the sensor unit 12 and the EM wave scanner 14 can be rotatably arranged around a defined imaging area of the system, for instance, to perform a scan of the person standing in the defined imaging area.

The speed at which the rotation of the platform 22 or the sensor unit 12 and the EM wave scanner 14 rotate can be constant. However, the speed can also be changed. For instance, the speed can be reduced in case a resolution of the EM wave scanner 14 is enhanced. To capture a 3D image of the person's body, the platform 22 or the sensor unit 14 and the EM wave scanner 14 can rotate by 360°.

The system 10 can further comprise a screen 21 for displaying the generated three-dimensional image of the body 11. The screen 21 can be connected to the processing unit 16.

The exemplary system 10 shown in FIG. 2 can furthermore comprise the same components as the system 10 in FIG. 1.

Figure 3:
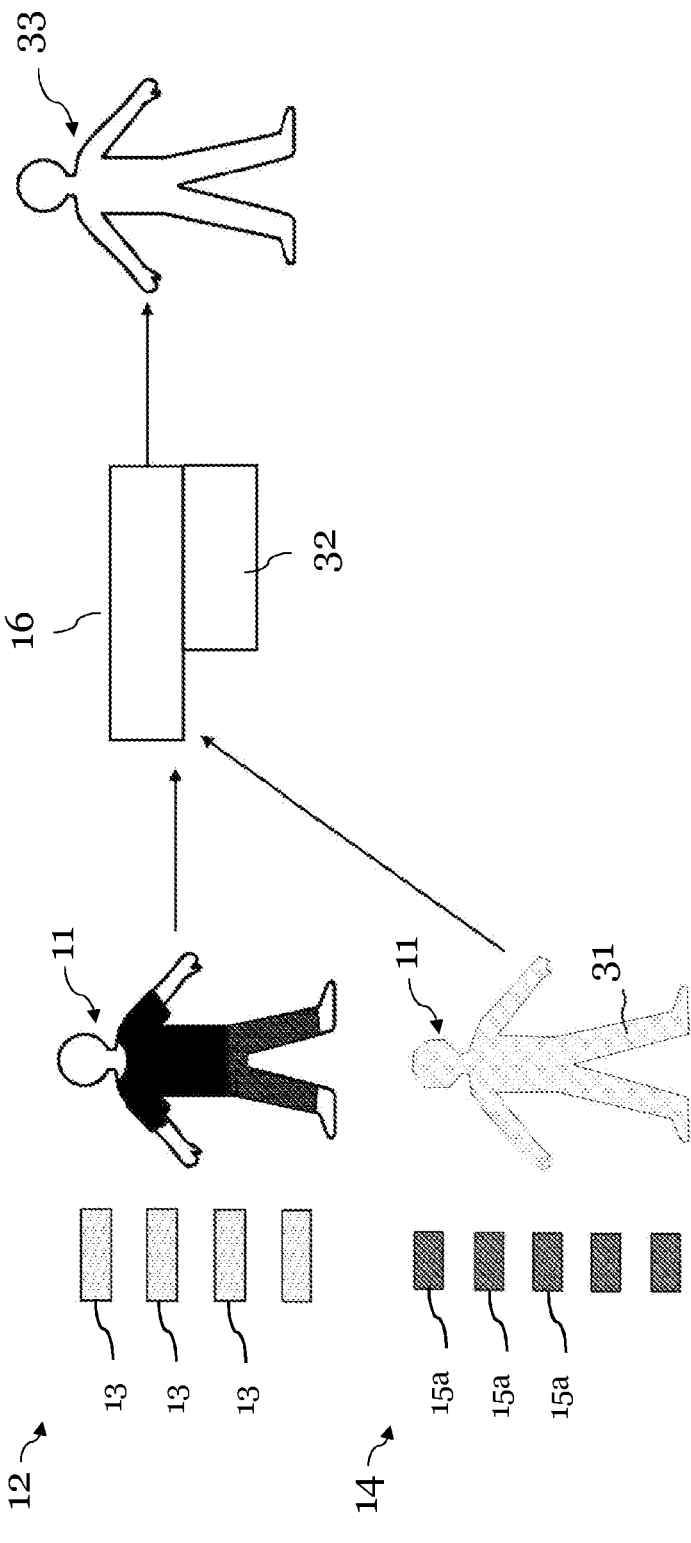
FIG. 3 shows the capturing of a three-dimensional image of a person's body according to an embodiment.

FIG. 3 shows the capturing of a three-dimensional image 33 of a person's body 11 according to an embodiment. Thereby, the imaging system 10 as shown in FIG. 1 or 2 is used.

As shown in FIG. 3, the sensor unit 12, e.g. one or more optical cameras operating in the visible wavelength range, can capture first imaging data of the person's body 11. Simultaneously (or directly afterwards), the EM wave scanner 15 (shown here by the vertically stacked antenna arrays 15a) can capture the second imaging data of the body 11. In particular, the person can wear clothes during the capture of the first and second imaging data.

The processing unit 16 can then process the first and second imaging data and generate the three-dimensional image 33 based on said processing results.

In particular, the processing unit 16 can be configured to determine a clothing surface of the body and to determine the shape of the body while taking into account said clothing surface. However, protruding or wrinkled clothes on the person can make it difficult to determine the correct shape of the person. For this reason, the second imaging data of the EM wave scanner 14 can be used to supplement the first imaging data.

The first imaging data can comprise optical, IR or acoustic imaging data of the person's clothed body 11. The second imaging data can comprise mm wave or cm wave imaging data which can be generated from reflections of the EM radiation from a surface of the clothing of the person as well as from the person's skin beneath the clothing. Thus, the second imaging data can comprise spatial information about the clothed and unclothed body of the person. In other words, the EM wave scanner 14 can measure both the position of the clothing as well as the position of the skin of the person. In FIG. 3, the measurement by the EM wave scanner 14 is indicated by a number of fix points 31 on the body 11, said fix points 31 representing the spatial coordinates captured by the EM wave scanner 14.

The processing unit 16 can be configured to distinguish the parts of the second imaging data that represent reflections form the clothing surface from the parts of the second imaging data that represent reflections from the skin below the clothing. For instance, this can be done by comparing the spatial coordinates of the captured 3D points (e.g., 3D pixels) in the second imaging data to each other and/or to the spatial coordinates of the 3D points in the first imaging data. The 3D points of the second imaging data that are spatially displaced inwards (i.e., into the body 11) by more than a threshold compared to the other 3D points of the second imaging data in the direct vicinity and/or compared to 3D points of the first imaging data at the same location on the body 11 can be assumed to represent the position of the skin. The remaining 3D points of the second imaging data can be assumed to represent the surface of the clothing and/or of skin which is not covered by clothing.

The EM wave scanner 14 can be configured to operate at a smaller resolution than the one or more camera units 13 of the sensor unit 11. For instance, this means that fewer fix points 31 (3D points) are recorded per area when capturing the second imaging data (as compared to the first imaging data). Using an EM wave scanner 14 which operates at smaller resolutions can drastically reduce the costs and complexity of the overall system 10.

However, alternatively, the resolution of the first and second imaging data could also be identical or the resolution of the second imaging data could be higher than the resolution of the first imaging data.

To generate a precise three-dimensional image of the body 11, the processing unit 16 can be configured, to first generate a three-dimensional image of the clothed body based on the first imaging data and the parts of the second imaging data which show the reflections of the EM radiation from the clothing. In other words, the processing unit 16 can first generate a three-dimensional image 33 of the clothed body 11 of the person mostly based on the first imaging data and can thereby supplement the first imaging data with parts of the second imaging data that represent reflections of the EM wave from the clothing. This can particularly be done for parts of the body 11 that are not or not fully captured by the sensor unit 15.

In addition, the processing unit 16 can be configured to analyze the parts of the second imaging data that represent reflections of the EM waves from the skin of the person in order to determine spatial coordinates of the body 11 under the clothing.

The processing unit 16 can further be configured to determine deviations, in particular spatial deviations, between a surface of the clothed body in the three-dimensional image and the spatial coordinates of the body under the clothing, which can be extracted from the second imaging data. In this way, the processing unit 16 can determine whether the body 11 in the three-dimensional image is distorted due to protruding clothing. In principle, the processor could also generate a further 3D image based on the reflections from the skin in the second imaging data and compare both 3D images to detect the deviations.

If such deviations exceed a threshold value for certain parts of the body 11, the processing unit 16 can modify or reconstruct these body parts in the previously generated three-dimensional image, e.g., by removing or reducing the protruding parts or by smoothing the respective body parts in the three-dimensional image. In this way, a three-dimensional image 33 can be generated which closely resembles the actual body shape of the person and is not overly distorted by protruding clothing.

Alternatively, the EM wave scanner 14 could also be configured to receive reflections of the EM radiation only from the skin of the person, but not from the clothing. In this alternative example, the processing unit 16 can be configured, to first generate a three-dimensional image of the clothed body based on the first imaging data and, subsequently, to determine deviations between the surface of the clothed body in this three-dimensional image and the spatial coordinates of the skin under the clothing in the second imaging data. Based on these deviations the processing unit 16 can then modify the three-dimensional image accordingly (e.g., remove protruding clothing etc.).

Figure 4:
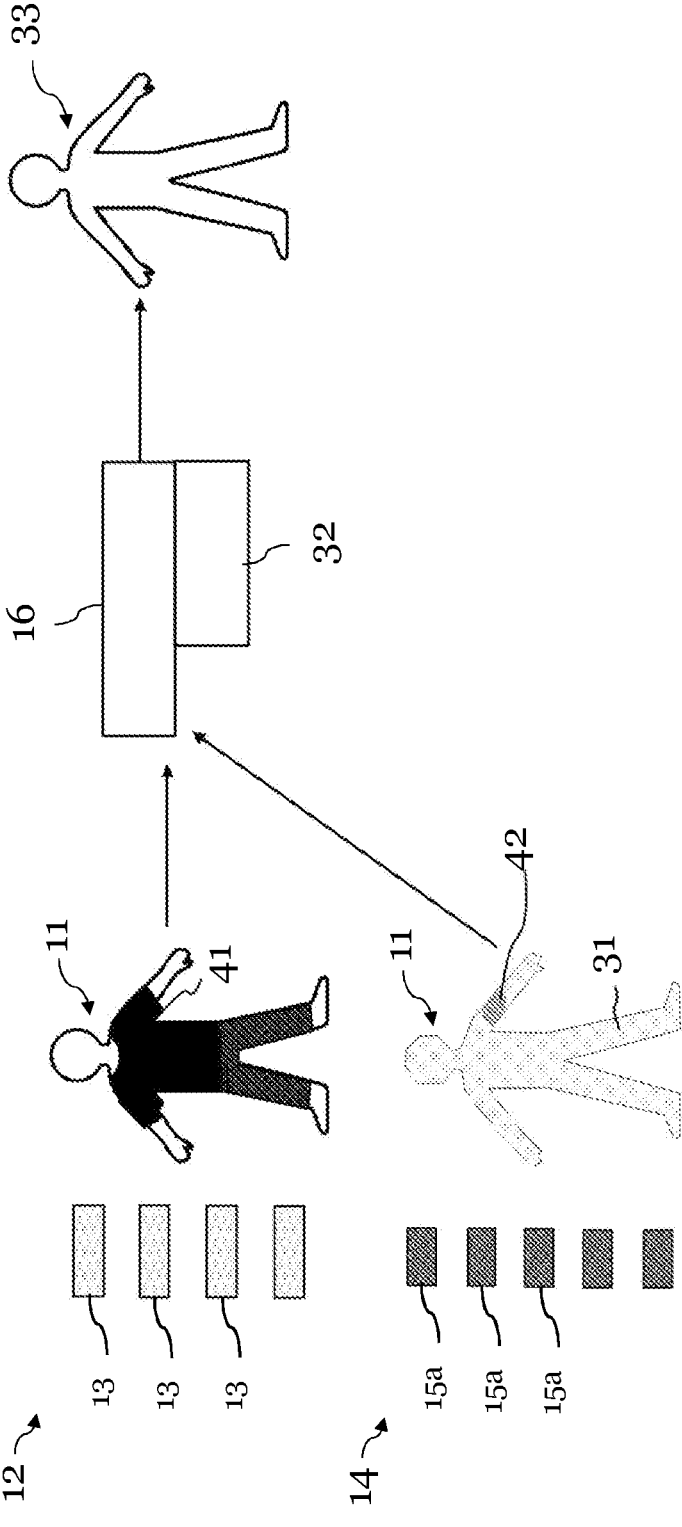
FIG. 4 shows the capturing of a three-dimensional image of a person's body according to an embodiment.

In a further example, shown in FIG. 4, the EM wave scanner 15 can be configured to increase its resolution for the parts of the user's body 11 for which the deviations exceed the threshold value. For instance, the processing unit 16 can detect if the clothing protrudes too far from the skin of the body, e.g., by comparing the 3D image of the clothed body with parts of the second imaging data. A protruding part 41 of the clothing is indicated in FIG. 4. This protruding part 41 could be caused by folds or wrinkles in the clothing or by a very thick clothing. If such a protruding part is detected, the resolution used by the EM wave scanner 14 can selectively be enhanced for the respective body part, as indicated in FIG. 4 by an increased number of fix points 42.

For example, the EM scanner is configured, in a first step, to scan the entire body 11 at a low resolution, and, in a subsequent step, to selectively scan the parts of the body 11 where the deviations exceed the threshold value with an increased resolution. Alternatively, the second scan can be carried out using the current orientation of the EM wave scanner 14 towards the person. In other words, the parts that need to be analyzed with a higher resolution can be identified during the "low resolution scan" and as such the resolution can be increased immediately to perform a "high resolution scan" of these parts such that there is no need for an additional 360° turn of either the rotatable platform 22 or the rotatable sensor unit/scanner 14. In principle, the person could also be scanned again, with the respective areas being scanned at a higher resolution.

Alternatively, the second imaging data could be captured only where needed. For example, if it is detected that there is a layer of cloths/folds on a certain part of the body 11 based on the first imaging data, then the second imaging data could be selectively captured to reveal the actual shape of the body 11 at that respective area.

The processing unit can comprise an artificial intelligence (AI) unit 32. This AI unit 32 can be configured to determine the deviations between the clothed surface and the skin surface and/or to carry out the modification of the three-dimensional image 33, i.e. removal of protruding parts from the body in the image 33.

The AI unit 32 can comprise a trainable neural network, e.g. a generative adversarial network (GAN). The AI unit 32 can be factory trained. For instance, an input layer of the AI unit 32 is fed by the first imaging data. The AI unit 32 can be configured to determine any areas on the body where the clothing might interfere with the actual measurement of the body 11. A deeper analysis by the AI unit 32 could then be carried out based on the second imaging data.

The AI unit 32 can receive the first and the second imaging data, if necessary, at a higher resolution. The AI unit 32 can generate the three-dimensional image 33 based on both imaging data sets. The AI unit 32 can also receive the dimensions of specific (adjacent) body parts for which the deviations of the first and second the imaging data are below the threshold value. Based on these data, the AI unit 32 could determine how the three-dimensional image 33 should look like. In particular, the AI unit 32 can be trained on such dependencies between different proportions of a body and/or knows standard values of measurements of different body parts.

In addition, the processing unit 16, particularly the AI unit 32, can be configured to analyze the three-dimensional image of the body 11 in order to extract further information about the body 11.

For example, the processing unit 16, in particular the AI unit 32, can be configured to calculate and to output dimensions of various body parts from the three-dimensional image 33, e.g. height, arm length, etc. For instance, the dimensions of at least one body part of the person can be determined based on the three-dimensional image 33.

Thereby, the AI unit 32 can use the proportions of body parts that can be measured correctly based on the first imaging data in order to reconstruct neighboring body parts that could not be measured correctly (e.g., due to protruding clothing). In addition or alternatively, the AI unit 32 can use the second imaging data to reconstruct the body parts that cannot be measured correctly from the first imaging data. The AI unit 32 can be trained to detect and reconstruct the shapes of the human body, in particular the shapes of specific body parts or characteristic body features (e.g., five fingers and five toes) such that the AI unit 32 can carry out the reconstruction of these body parts based on the first and second imaging data.

The processing unit 16 can further be configured to determine a clothing size of the person based on the three-dimensional image 33 of the body 11. For instance, the measurements of the person provided by the system can be used to detect a standardized clothing size, e.g. S, M or L. This standardized size can be converted to the respective clothing size of a manufacturer. In this way, a user knows which clothing size to choose from a specific manufacturer. It is also possible that the standardized clothing size is only determined for parts of the user's body 11. Therefore, the user could input a body region for which he wants to obtain the standardized clothing size. This input can be performed on an input unit of the system, e.g. a touch display. For example, if the user wants to purchase a new T-shirt then only the upper part of the user's body 11 can be measured and processed.

For instance, the system 10 could be used at an orthopedist or in shopping centers to allow people to quickly determine their clothing sizes. In another example, the information on the body size and dimensions obtained by the system 10 could be used to select and/or manufacture a well-fitting protease.

In a further application example, the processing unit 16 and/or the AI unit 32 can be configured to detect medical anomalies in the three-dimensional image. For instance, certain diseases could be detected in case certain areas of the body 11 are enlarged. The AI unit 32 could be trained for detecting such medical anomalies using training data which comprise 3D images of bodies with and without anomalies.

When used for detecting medical anomalies, the system 10 could be installed on or above a hospital bed. The elements of the sensor unit 12 and the EM wave scanner 14 could be arranged for imaging the body of a patient in the bed. In this way, the body of an immobile patient in the bed could be scanned for medical anomalies without having to move the person.

The processing unit could also be configured to analyze the three-dimensional image, the first imaging data and/or the second imaging data for threat detection, e.g. detection of dangerous objects. By combining optical, infrared or acoustic imaging data with cm/mm wave imaging data, the system 10 can effectively detect dangerous objects both above and below the person's clothing. As such, the system could be used as a security scanner, e.g. at airports.

Figure 5:
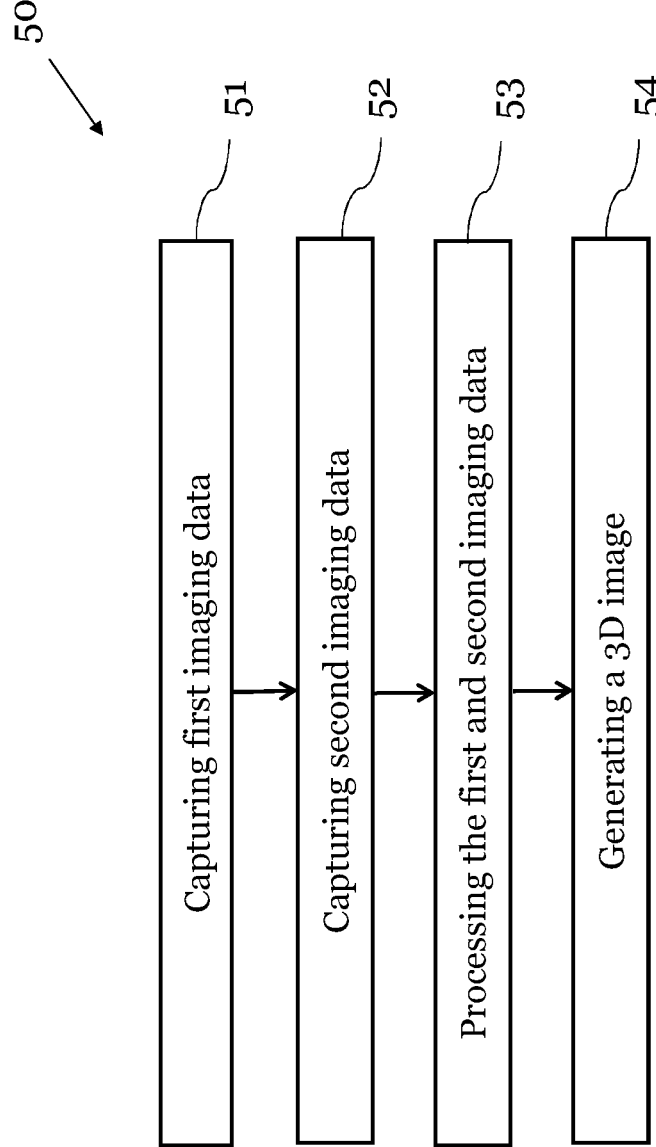
FIG. 5 shows a flow diagram of a method for imaging a body of a person according to an embodiment.

FIG. 5 shows a flow diagram of a method 50 for imaging the body 11 of the person according to an embodiment.

The method 50 comprises the steps of: capturing 51 the first imaging data of the body 11 by means of optical imaging and/or infrared imaging and/or acoustic imaging; capturing 52 the second imaging data by transmitting EM radiation in a mm and/or cm range towards the body 11, and by receiving a reflection of said EM radiation from the body 11; processing 53 the first imaging data and the second imaging data; and generating 54 a three-dimensional image of the body based on said processing 53.

The method 50 can be carried out by any one of the systems 10 shown in FIGS. 1-4.

All features described above or features shown in the figures can be combined with each other in any advantageous manner within the scope of the invention.

The invention claimed is:

1. A system for imaging a body of a person, comprising:
   a sensor unit configured to capture first imaging data of the body, wherein the sensor unit comprises an optical camera and/or an infrared camera and/or an acoustic imaging sensor;
   an electromagnetic, EM, wave scanner configured to capture second imaging data of the body, wherein the EM wave scanner comprises a plurality of antennas which are configured to transmit EM radiation in a mm and/or cm range towards the body, and to receive a reflection of said EM radiation from the body; and
   a processing unit which is configured to process the first imaging data and the second imaging data and to generate a three-dimensional image of the body based on said processing, wherein the second imaging data comprises reflections of the EM radiation from the clothing of the person as well as from a skin of the person beneath the clothing, wherein the processing unit is configured to determine spatial coordinates of the body under the clothing based on the reflections of the EM radiation from the skin of the person in the second imaging data, wherein the processing unit is configured to determine deviations, in particular spatial deviations, between a surface of the clothed body in the three-dimensional image and the spatial coordinates of the body under the clothing, wherein the EM wave scanner is configured to selectively capture further second imaging data of parts of the body for which the deviations exceed a threshold value, and wherein these further second imaging data are captured with an increased resolution as compared to the second imaging data.

2. The system of claim 1,
wherein the processing unit is configured to determine a clothing surface of the body based on the first imaging data.

3. The system of claim 1,
wherein the processing unit is configured to smooth the clothing surface of the body in the three-dimensional image by removing wrinkles or folds from the clothing surface in the three-dimensional image.

4. The system of claim 1,
wherein the processing unit is configured to generate the three-dimensional image of the body based on the first imaging data, and to modify said three-dimensional image, in particular to increase a level of detail or remove unwanted image components, based on information extracted from the second imaging data.

5. The system of claim 1,
wherein the sensor unit is configured to capture the first imaging data with a first resolution; and wherein the EM wave scanner is configured to capture the second imaging data with a second resolution which is lower than the first resolution.

6. The system of claim 1,
wherein the processing unit is configured to generate the three-dimensional image of the body based on the first imaging data and based on the reflections of the EM radiation from the clothing of the person in the second imaging data, in particular if the clothing or certain items of the clothing are not captured completely by the first imaging data.

7. The system of claim 1,
wherein the processing unit is configured to modify or reconstruct the parts of the body in the three-dimensional image for which the deviations exceed the threshold value.

8. The system of claim 1,
wherein the processing unit comprises an artificial intelligence, AI, unit, in particular a trainable neural network.

9. The system of claim 1,
wherein the processing unit is configured to analyze the three-dimensional image of the body in order to detect a medical anomaly.

10. The system of claim 1,
wherein the processing unit is configured to determine the dimensions of at least one body part and/or to determine at least one clothing size of the person based on the three dimensional image of the body.

11. The system of claim 1,
wherein the plurality of antennas of the EM wave scanner are arranged in at least two vertically displaced antenna arrays.

12. The system of claim 11,
wherein at least a part of the sensor unit is arranged in-between two of the vertically displaced antenna arrays.

13. The system of claim 1,
wherein the sensor unit and the EM wave scanner are rotatably arranged around a defined imaging area of the system.

14. The system of claim 1, further comprising:
a rotatable platform for the person to stand on;
wherein the sensor unit and the EM wave scanner are stationary arranged relative to the platform.

15. A method for imaging a body of a person, comprising:
capturing first imaging data of the body by means of optical imaging and/or infrared imaging and/or acoustic imaging;

capturing second imaging data by transmitting EM radiation 20 in a mm and/or cm range towards the body, and by receiving a reflection of said EM radiation from the body, wherein the second imaging data comprises reflections of the EM radiation from the clothing of the person as well as from a skin of the person beneath the clothing;

processing the first imaging data and the second imaging data;

generating a three-dimensional image of the body based on said processing;

determining spatial coordinates of the body under the clothing based on the reflections of the EM radiation from the skin of the person in the second imaging data;

determining deviations, in particular spatial deviations, between a surface of the clothed body in the three-dimensional image and the spatial coordinates of the body under the clothing; and selectively capturing further second imaging data of parts of the body for which the deviations exceed a threshold value, wherein these further second imaging data are captured with an increased resolution as compared to the second imaging data.

* * * * *